April 12, 1932.　　　F. PIRAINO　　　1,853,995

PHOTOGRAPHING EQUIPMENT

Filed Aug. 12, 1931　　2 Sheets-Sheet 1

Filippo Piraino,
INVENTOR

BY Victor J. Evans and Co. ATTORNEYS

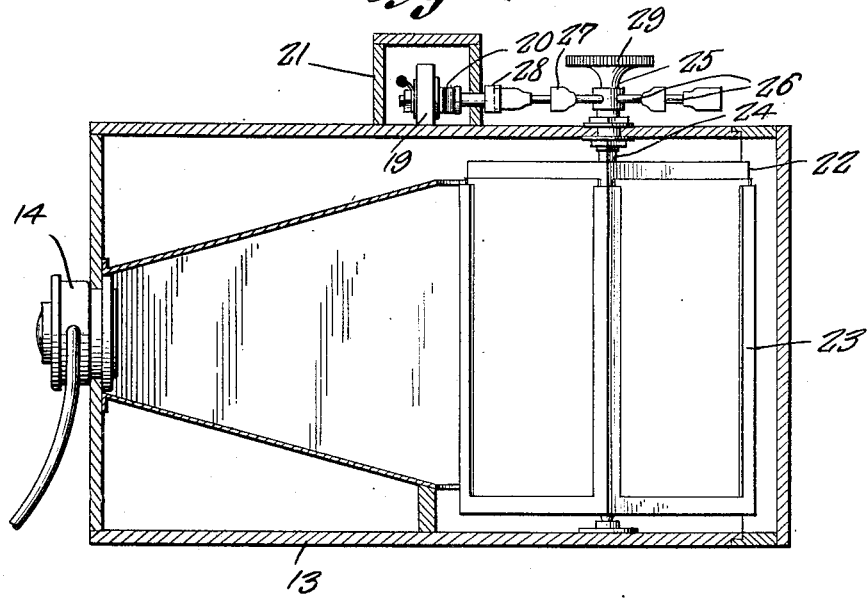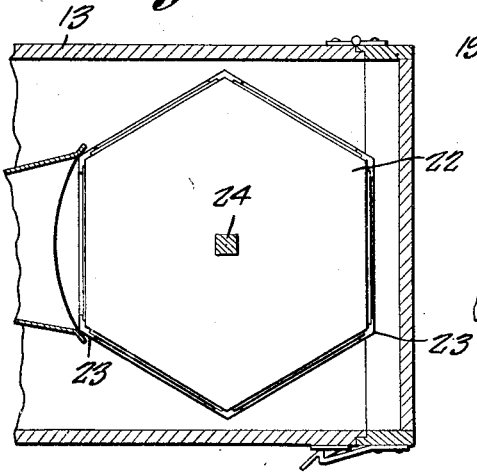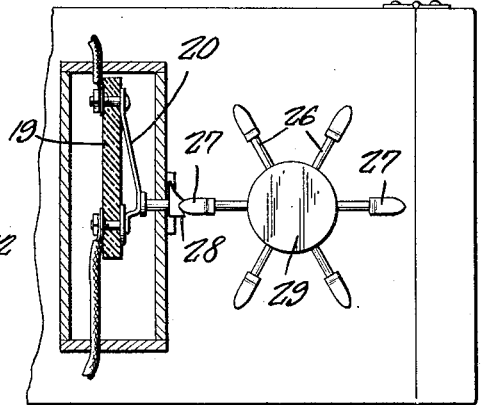

Patented Apr. 12, 1932

1,853,995

UNITED STATES PATENT OFFICE

FILIPPO PIRAINO, OF TRENTON, NEW JERSEY, ASSIGNOR OF ONE-HALF TO CALOGERO PIRAINO, OF TRENTON, NEW JERSEY

PHOTOGRAPHING EQUIPMENT

Application filed August 12, 1931. Serial No. 556,647.

The invention relates to a photographing equipment and has for its primary object to provide an inclosure, wherein a part thereof constitutes a booth or photographing space, the latter fitted with electric fixtures so disposed as to reflect upon an image so that a clear photograph or a group of photographs can be made in the use of a camera, the same having the film holder operative for controlling a switch to regulate the lighting effect during exposures made by the camera, the latter being manually operated in the usual manner, the control of the lighting effect being novel in form and is under positive regulation by the operator of the camera.

Another object of the invention is to provide an equipment of this character which is extremely simple in construction, thoroughly effective and reliable in its operation and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4 is a vertical longitudinal sectional view through the camera.

Figure 5 is a fragmentary horizontal sectional view thereof.

Figure 6 is a fragmentary top plan view partly in section showing in detail the switch and its control.

Similar reference characters indicate corresponding parts throughout the several views in the drawings.

Figure 1:
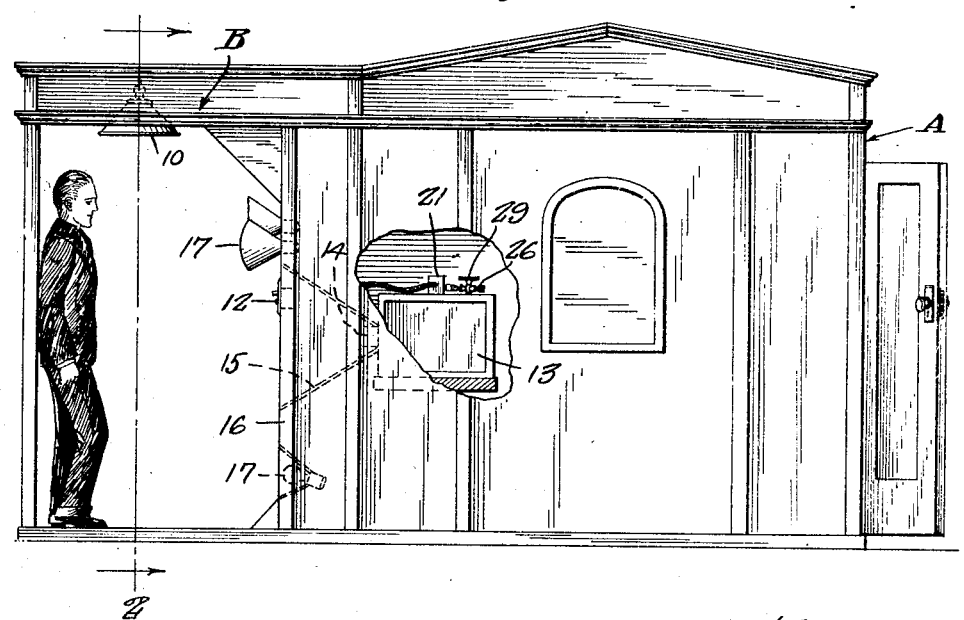
Figure 1 is an elevation of an equipment constructed in accordance with the invention and a portion of the inclosure being broken away.

Referring to the drawings in detail, A designates generally an inclosure having formed therewith a photographing booth B, the latter susceptible of entry from either side and depending from the top of this booth is an electric light fixture 10, the same arranged in a normally open electric circuit including the wires 11 and is part of a house electric lighting system, which circuit includes a push button switch 12 manually controlled for the lighting and extinguishing of the lighting fixture 10. Within the inclosure A is arranged a camera 13, the lens barrel or casing 14 of which confronts a tapered window or exposure opening 15 opening into the booth B for the photographing of an image therein in the use of the camera and within this casing 14 is a shutter mechanism operable in the usual manner, for example, through the medium of a conventional pneumatic actuator tube.

Arranged with the vertical wall 16 about the opening or window 15 at proper localities for the best lighting effect are reflector electric lamps 17, these being arranged in a normally open electric circuit 18 joined with the circuit wires 11 on the current side of the switch 12. The circuit 18 for the lamps 17 has included therein a switch 19 adapted to be automatically closed by a spring contact 20 and this switch is contained in a casing 21 built upon the body of the camera 13 at its top. Within the camera 13 is a rotatable film holder or rack 22 adapted to contain preferably six or more film receiving frames 23 for successive exposure by the camera in the working thereof. The center spindle or axle 24 of the holder or rack is suitably journaled in the body of the camera 13 and at one end projects exteriorly thereof through the top of said camera and has fixed on this projected portion a hub 25 carrying the radially disposed switch closing arms 26, these provided with shoe terminals 27 arranged in the path of an actuator button 28 for the spring contact 20 of the switch 19 for the closing of the latter automatically. The button 28 is of a construction to permit the operation thereof on movement of the arms 26 in one direction and will prevent reverse movement of the arms as will be obvious from Figure 6 of the drawings.

The hub 25 is formed with a hand knob 29 manually operable by the user of the camera or operator thereof so that when the knob 29 is manually turned the rack or holder 22 will be rotated to successively bring into proper position films therein for exposure by the camera in the taking of pictures of an image within the booth B. As each film in the holder or rack 22 is brought into proper exposing position an arm 26 will trip the button 28 to effect the closing of the switch 19 by the contact or member 20 and in this fashion the lamps 17 will be illuminated for the proper lighting effect of the image within the booth B for photographing purposes.

Figure 2:
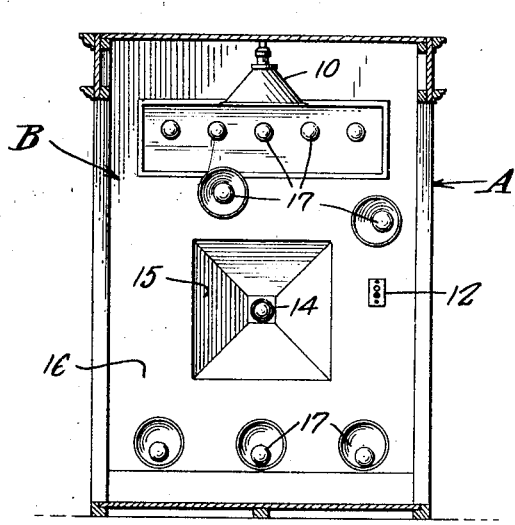
Figure 2 is a sectional view on the line 2—2 of Figure 1 looking in the direction of the arrows.
Figure 3:
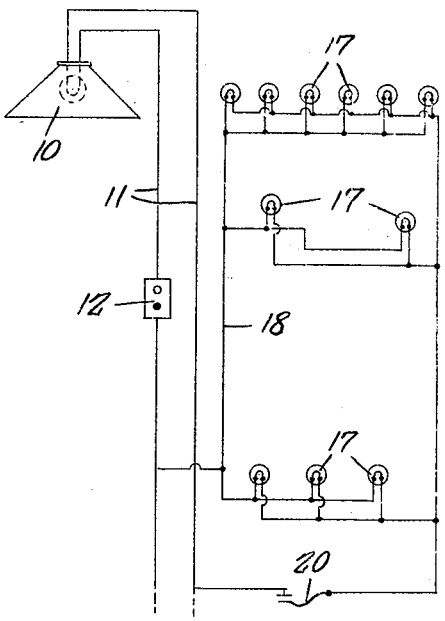
Figure 3 is a diagrammatic plan view of the light control circuit.

The lamps 17 are preferably disclosed at the location shown in Figures 1 and 2 of the drawings within the booth B, yet it is to be understood that the same may be otherwise distributed to obtain maximum and the best lighting effects for an image to be photographed when within the booth.

What is claimed is:—

1. In a structure of the kind described, an inclosure having a photographing booth, electric lights adjustable within the booth and having reflectors, a camera for photographing an image within the booth, and means controlled by the respective exposures by the camera for effecting the automatic lighting of said lights within the booth.

2. In a structure of the kind described comprising an inclosure having a photographing booth, a plurality of electric lamps in said booth and arranged in a normally open electric circuit, a camera within the inclosure for photographing an image within the booth, a movable film holder arranged within the camera and adapted for exposure successively of a plurality of films on operation of the camera, a switch arranged in said circuit, and means operable by the holder for closing the switch synchronously with the positioning of the films for exposure.

3. In a structure of the kind described comprising an inclosure having a photographing booth, a plurality of electric lamps in said booth and arranged in a normally open electric circuit, a camera within the inclosure for photographing an image within the booth, a movable film holder arranged within the camera and adapted for exposure successively of a plurality of films on operation of the camera, a switch arranged in said circuit, means operable by the holder for closing the switch synchronously with the positioning of the films for exposure, and means for manually operating the film holder.

4. In a structure of the kind described, a photographing booth, a plurality of electric lights therein and having reflectors, a normally open electric circuit including said lights, a camera for photographing an image within the booth, a movable film holder within the camera, a switch arranged in said circuit, and means operated by the holder for automatically closing the switch.

5. In a structure of the kind described, a photographing booth, a plurality of electric lights therein and having reflectors, a normally open electric circuit including said lights, a camera for photographing an image within the booth, a movable film holder within the camera, a switch arranged in said circuit, means operated by the holder for automatically closing the switch, and means for operating the holder.

In testimony whereof I affix my signature.

FILIPPO PIRAINO.